United States Patent Office 3,283,012
Patented Nov. 1, 1966

3,283,012
PROCESS FOR PREPARING 2-PERFLUORO-
ALKYLETHANOL
Richard Irving Day, Wilmington, Del., assignor to E. I. du
Pont de Nemours and Company, Wilmington, Del., a
corporation of Delaware
No Drawing. Filed May 29, 1962, Ser. No. 198,437
5 Claims. (Cl. 260—633)

The present invention is directed to a process for hydrolyzing iodides of the formula $R_fCH_2CH_2I$ with oleum to alcohols of the formula $R_fCH_2CH_2OH$.

The alcohols $R_fCH_2CH_2OH$ are valuable intermediates for preparing oil and water repellents, surface active agents, lubricants and a number of other useful materials. However, these alcohols are not readily available. A previously disclosed method for the preparation of these alcohols has been the reaction of the corresponding iodides $R_fCH_2CH_2I$ with the silver salt of acetic acid to form the corresponding acetate ester, followed by the hydrolysis of this ester to the alcohol $R_fCH_2CH_2OH$. However, this process is not readily applied to commercial practice because of the expense of silver acetate and the necessity of recovering the silver from the silver iodide formed in the reaction. Basic hydrolysis is also not applicable for preparing these alcohols since only $R_fCH=CH_2$ is formed. The iodides $R_fCH_2CH_2I$ are readily available by the reaction of perfluoroalkyl iodides $R_fI$ with ethylene under the influence of heat or light.

It is, therefore, an object of this invention to provide a novel method for converting the iodides $R_fCH_2CH_2I$ to the corresponding alcohols $R_fCH_2CH_2OH$.

It is another object of this invention to provide a novel process which does not require the use of expensive reagents such as silver.

It is still another object to provide a process which gives the desired alcohol products directly. These and other objects will become apparent from the following description and claims.

More specifically, the present invention is directed to a process for the manufacture of alcohols in the series $R_fCH_2CH_2OH$, wherein R is a perfluoroalkyl group containing from one to 20 carbon atoms, which process comprises reacting the corresponding $R_fCH_2CH_2I$ with oleum at a temperature at which the reactants are liquid, following this reaction by dilution of the mixture with water, heating the reaction mixture to hydrolyze the intermediate fluoroalkyl hydrogen sulfate $R_fCH_2CH_2OSO_2OH$, and recovering the alcohols $R_fCH_2CH_2OH$ from the reaction mixture.

The present invention consists of two reactions which are carried out in sequence. The first is the reaction of the iodide $R_fCH_2CH_2I$ with oleum to form the fluoroalkyl hydrogen sulfate $R_fCH_2CH_2OSO_2OH$ and $I_2$. The second is the hydrolysis of the ester $R_fCH_2CH_2OSO_2OH$ with aqueous acid to the alcohol, $R_fCH_2CH_2OH$, and sulfuric acid. The first reaction takes place only in oleum. Oleum is sulfuric acid containing an excess of free sulfur trioxide. The reaction is not feasible in 100% sulfuric acid or sulfuric acid diluted with water. The second reaction requires the dilution of the first reaction mixture with water. Therefore, the original reaction mixture may be diluted with sufficient water to convert all of the excess sulfur trioxide to sulfuric acid and still allow some free water to be present. The reaction could be carried out in two separate steps if the intermediate bisulfate ester is first isolated from the reaction mixture. However, there is no advantage gained thereby.

The reaction is usually carried out by adding the fluorinated iodide to the oleum, generally with agitation. The reaction appears to be rapid. The iodides are not very soluble in oleum but they dissolve as the reaction proceeds, usually within a few minutes after addition. The ester reaction product appears to be soluble in oleum. A by-product of this reaction, the dialkyl sulfate $(R_fCH_2CH_2O)_2SO_2$, is formed to a small extent. This product appears to be only partially soluble in oleum.

The second product of the reaction of the fluorinated iodide with oleum is iodine, probably formed by the reaction of hydrogen iodide with sulfuric acid or sulfur trioxide. The reaction mixture visibly darkens during the reaction as iodine crystallizes from solution. During the second step of the process, hydrolysis stage, the iodine remains in the reaction mixture. At the end of the hydrolysis, the iodine present is usually converted back to iodide ion with sodium sulfite or bisulfite. This is done so that the iodine will not interfere with the recovery of the alcohol product. Since iodine is valuable, it is commercially desirable to recover it from the residual acid solution. One exemplary method of recovering the iodine would be by neutralizing the acidic solution until faintly acidic, oxidizing with sodium nitrite and recovering the free iodine from the aqueous solution. The iodine may also be recovered by proper modification of the ion exchange processes as disclosed in U.S. 2,945,746, or Japanese Patent 4,464 (1952).

The reaction temperature of the first step is critical only as it affects obtaining proper mixing of the iodide and oleum. It is necessary that both reagents be liquid at the reaction temperature. The melting point of oleum is dependent on the percent of free sulfur trioxide. The melting point of 100% sulfuric acid (no free $SO_3$) is 10.49° C. It decreases as free $SO_3$ is added to −10° C. at 13% free $SO_3$, then increases, reaching a maximum of 35° C. at 45% free $SO_3$, then decreases again. The melting point of 20–25% oleum, the preferred reagent, is about 10° C. The iodides $R_fCH_2CH_2I$ have melting points which naturally increase with the number of carbons; those containing nine or more carbons are usually solids at room temperature. Temperature, as might be expected, increases the rate of the reaction. The reaction does take place at room temperature (ca. 25° C.) with those iodides which are liquid. Because of the corrosive nature of oleum, it is preferred to carry out the reaction at or slightly above the temperature where all the reagents become liquid, if this is above room temperature, but higher temperatures can be used if desired.

The reaction times required vary somewhat with the starting materials. Usually the first step requires between one and two hours and the second step from one to as many as ten hours. Completion of the hydrolysis is detected readily as hereinafter described.

The method used to separate the product alcohol from the aqueous acid reaction mixture depends on the product itself. Those products containing from three to about five carbons are reasonably soluble in water. These can be separated by distillation of a mixture of water and the fluorinated alcohol from the reaction mixture. Fractional distillation, drying, azeotropic distillation of water or a combination of these may be used to separate the fluorinated alcohol from water.

The water insoluble but volatile products can be separated from the reaction mixture by co-distillation of a mixture of water and the alcohol using a receiver designed to separate two mutually insoluble materials and to return the undesired material to the still. In the present case, the desired alcohols are more dense than water so the upper water phase is returned. The separated alcohol is then dried and further distilled if so desired. Other purification methods, such as the method used in the examples, may also be used. The very high molecular weight alcohols are also insoluble in the reaction mixture. They can be separated directly from the reaction mixture using standard techniques. Unless the boiling point of the alcohol is very high, it is preferable to remove it from the reaction mixture by co-distillation with water since this gives a product which is freerer of acid and by-products.

If the alcohol is distilled from the hydrolysis mixture as it is formed, the end point of the hydrolysis is easily detected by the lack of further alcohol distillate and the weight of the alcohol recovered. For those alcohols which cannot be removed by distillation, the proper reaction time must be determined by tests. For example, such tests would involve heating the hydrolysis mixture for varying lengths of time and determining from the composition of the product obtained when hydrolysis is complete. From this analysis, the preferred reaction time is determined.

The by-product dialkyl sulfate $(R_fCH_2CH_2O)_2SO_2$ is characterized by being relatively nonvolatile and not readily hydrolyzed. Thus, it may or may not occur in the alcohol product, depending on the method of recovery and its volatility. Undoubtedly some of the dialkyl sulfate is hydrolyzed during the hydrolysis of the bisulfate ester but much remains when the hydrolysis of the bisulfate is complete. The dialkyl sulfate by-product can be hydrolyzed by much more strenuous acidic conditions than required for the bisulfate ester or, preferably by isolation after removal of the alcohol product and hydrolysis using alkaline conditions. The dialkyl sulfate does not normally contain more than 20% of the equivalent of the fluorinated iodide starting material. Unduly long reaction times in the first step and short hydrolysis times in the second step favor formation of the dialkyl ester. Of course, hydrolysis of the dialkyl sulfate gives further desired alcohol product so the material is not completely lost.

The perfluoroalkyl group $R_f$ of the fluoroalkyl iodides $R_fCH_2CH_2I$, used as starting materials in this process, contains from one to twenty carbons and so the fluoroalkyl iodides contain from three to twenty-two carbons. Examples of the iodides which may be used are $F(CF_2)_nCH_2CH_2I$ ($n=1-20$)

$(CF_3)_2CF(CF_2)_mCH_2CH_2$ ($m=0-17$)

$CF_3[CF_2CF(CF_3)]_pCH_2CH_2I$ ($p=1-6$)

$(CF_3)_2CF[CF_2CF(CF_3)]_rCH_2CH_2I$ ($r=1-5$)

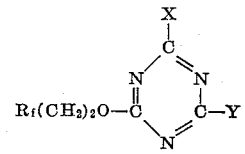

($s=3-5$), and the like. Of these, $F(CF_2)_nCH_2CH_2I$, and especially those where $n=6-14$, are preferred. The compounds $R_fCH_2CH_2I$ are prepared by reaction of the perfluoroalkyl iodides $R_fI$ with ethylene, using the thermal or photochemical reactions of the art (cf. Haszeldine, J. Chem. Soc., 2856 (1949); 2789 (1950)). The properties of some typical preferred iodides are given below:

| Compound | Boiling Point, °C. | Melting Point, °C. |
|---|---|---|
| $CF_3CH_2CH_2I$ | 90 | |
| $CF_3(CF_2)_2CH_2CH_2I$ | 62/100 mm | |
| $CF_3(CF_2)_3CH_2CH_2I$ | 140 | |
| $CF_3(CF_2)_4CH_2CH_2I$ | 96/100 mm | |
| $CF_3(CF_2)_5CH_2CH_2I$ | 180 | |
| $CF_3(CF_2)_6CH_2CH_2I$ | 73/8 mm | 44-45 |
| $CF_3(CF_2)_7CH_2CH_2I$ | | 55-56 |
| $CF_3(CF_2)_9CH_2CH_2I$ | | 82-83 |

Typical properties for the preferred alcohols obtained by the present process are shown below:

| Compound | Boiling Point, °C. | Melting Point, °C. |
|---|---|---|
| $CF_3CH_2CH_2OH$ | 100 | |
| $CF_3(CF_2)_2CH_2CH_2OH$ | 125 | |
| $CF_3(CF_2)_3CH_2CH_2OH$ | 142 | |
| $CF_3(CF_2)_5CH_2CH_2OH$ | 93/35 mm | |
| $CF_3(CF_2)_6CH_2CH_2OH$ | 84/10 mm | |
| $CF_3(CF_2)_7CH_2CH_2OH$ | 99/15 mm | 42-44 |
| $CF_3(CF_2)_9CH_2CH_2OH$ | 111-111.5/10 mm | 80-81 |
| $CF_3(CF_2)_{10}CH_2CH_2OH$ | | 108-110 |

The alcohols prepared by the present process wherein $R_f$ contains four or more carbons are useful for preparing compounds of the structure

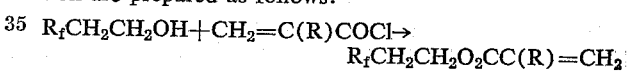

wherein X and Y are amino or hydrazino groups. As described in French Patent 1,208,421, these products are useful textile treating agents, imparting water and oil repellency thereto.

The alcohols prepared in the present invention also produce useful esters. The reaction of the alcohols with organic acids, acid halides or acid anhydrides gives the corresponding esters. Those esters derived from acrylic or methacrylic acid and the alcohols of the present invention are prepared as follows:

$R_fCH_2CH_2OH + CH_2=C(R)COCl \rightarrow$
$R_fCH_2CH_2O_2CC(R)=CH_2$ wherein R is H or methyl and $R_f$ is a perfluoroalkyl group containing from six to 14 carbons. Polymers of these esters are useful as oil and water repellents. Esters of polybasic acids can give stable oils and lubricants. Reaction with phosphorus pentoxide produces the mono- and difluoroalkyl phosphates $(R_fCH_2CH_2O)_nPO(OH)_{3-n}$ ($n=1-2$) which are valuable surface active agents when $R_f$ contains more than four carbons.

The alcohols wherein $R_f$ contains from one to three carbons are readily converted to the corresponding bromides by well known methods and hence into the valuable siloxanes described in U.S. Patent 2,961,425.

Representative examples illustrating the present invention follow. All parts are by weight.

*Example I*

To 142 parts of 25% oleum was added dropwise with stirring 71.1 parts of 1-iodo-1H,1H,2H,2H-tridecafluorooctane over a period of 65 minutes while the reaction temperature was maintained at 25±1° C. by means of water cooling. After an additional thirty minute period of stirring at this temperature, the dark reaction mixture was poured with agitation into 600 parts of water containing 5 parts of sodium sulfite in a 10 minute period. The temperature was maintained at or below 50° C. by application of water cooling. An additional 150 parts of water were used to rinse adherent reaction mixture from the reaction vessel into the aqueous phase. The pale yellow, almost clear, liquid was allowed to cool. The liquid was then transferred to a reaction vessel equipped with a water separator, reflux condenser combination and then was heated to boiling over a period of 70 minutes with agitation. Phase separation occurred in the reaction vessel as the temperature was raised and, after 30 minutes of reflux, collecton of a lower layer (nonaqueous) in the separator ceased. The 48.2 parts of heavy liquid lower layer were withdrawn and fractionally distilled, B.P. 88–95° C. at 28–30 mm. (most at 89–90°), to give 45.8 parts (84% yield) of the alcohol $$CF_3(CF_2)_5CH_2CH_2OH$$

*Analysis.*—Calcd. for $C_8H_5F_{13}O$: C, 26.4; H, 1.4; F, 67.8. Found: C, 26.5; H, 1.2; F, 68.0; $n_D^{25}$ 1.3135; $d_4^{25}$ 1.6782.

When the residual contents of the reaction vessel were cooled, a crystalline residue of 7.3 parts (accounting for 12.3% of the fluoroalkyl iodide reactant) of the dialkyl sulfate $(CF_3(CF_2)_5CH_2CH_2O)_2SO_2$ was obtained, M.P. 77.5–78.0° C.

*Analysis.*—Calcd. for $C_{16}H_8F_{26}O_4S$: C, 24.3; H, 1.0; F, 62.5; S, 4.0. Found: C, 24.3; H, 1.0; F, 62.8; S, 4.0.

Example II

To 517 parts of 20% oleum was added 86.1 parts of 1H,1H,2H,2H-heptadecafluoro-1-iododecane (solid) over a period of 1 hour while the reaction mixture was maintained at 90–95° C. The reaction mixture was stirred for a further one-half hour. The reaction mixture was then dropped into 1000 parts of water containing 15 parts of sodium sulfite at room temperature. The reactor was washed with a further 500 parts of water. Twenty parts of ethyl alcohol were added to the aqueous mixture which was heated at 100° for one-half hour. The mixture was then distilled as in the first example over a period of two hours. The distilled product was treated with boiling 1,1,2-trichlorotrifluoroethane until all of the soluble material had dissolved and the insoluble material was removed by filtration. Evaporation of the solvent gave 55 parts (79% yield) of 1H,1H,2H,2H-heptadecafluoro-1-decanol $F(CF_2)_8CH_2CH_2OH$, M.P. 43° C. Eleven parts of bis(1H,1H,2H,2H-heptadecafluorodecyl) sulfate were also obtained as insoluble residue in the acid reaction media.

*Analysis of* $F(CF_2)_8CH_2CH_2OH$. — Calcd. for $C_{10}F_{17}H_5O$: C, 25.9; H, 1.1. Found: C, 26.1 H, 1.3.

Example III

Example II was repeated adding 258.3 parts of 1H,1H, 2H,2H-heptadecafluoro-1-iododecane to 1551 parts of 20% oleum over a period of one and one-half hours at 90–95° C. After stirring for one hour, the acid mixture was dropped into 3000 parts of water at room temperature contining 45 parts of sodium sulfite. The acid reactor was washed with a further 500 parts of water. Ethyl alcohol (36 parts) was added to the aqueous mixture which was then heated at 100° for one-half hour. The mixture was then distilled as in Example I (3½ hrs.). The product of the distillation was treated with 1,1,2-trichlorotrifluoroethane as in Example II, giving 177 parts (85% yield) of 1H,1H,2H,2H-heptadecafluoro-1-decanol and 19 parts of the bis(heptadecafluoro-1-decyl) sulfate ester as an acid insoluble residue.

Example IV

Example II was repeated adding 67.4 parts of 1H,1H, 2H,2H-henicosafuoro-1-iododecane to 400 parts of 20% oleum at 90–95° C. over a period of one and one-half hours. The mixture was then stirred at the same temperature for one-half hour. The mixture was dropped into 1000 parts of water containing 11 parts of sodium sulfite at room temperature. The acid reactor was washed with a further 500 parts of water. Ethyl alcohol (20 parts) was added and the aqueous mixture was then heated at 100° C. for one-half hour, then distilled (6 hrs.) as in Example I. The distillate was treated with 1,1,2-trichlorotrifluoroethane as in Example II, giving 45.5 parts (81% yield) of 1H,1H,2H,2H-henicosafluoro-1-dodecanol, B.P. 111–111.5° C. at 10 mm., M.P. 92–93° C.; 9.5 parts of the bis(henicosafluoro-1-dodecyl) sulfate ester were obtained as an insoluble residue in the aqueous acid.

*Analysis of* $F(CF_2)_{10}CH_2CH_2OH$. — Calcd. for $C_{12}H_5F_{21}O$: C, 25.5; H, 0.9. Found: C, 25.8; H, 0.9.

Example V

Example IV was repeated in an identical fashion except that the period of addition of the iodide was one hour rather than one and one-half hours and that the distillation required four hours rather than six hours. The yield of product was 78% (44 parts) and 9.5 parts of bis(fluoroalkyl) sulfate ester were obtained.

Example VI

Example IV was repeated in detail using 202.2 parts of the same iodide, 1400 parts of 20% oleum, 3000 parts of water, 40 parts of sodium sulfite, 500 parts of water wash and 60 parts of alcohol. The times involved were identical with Example IX except that the distillation required five and one-half hours. The product was isolated as above, 118 parts, M.P. 89–90° C.; 55 parts of material were isolated as an acid insoluble residue. Treatment of the acid insoluble material with 1,1,2-trichlorotrifluoroethane at the boiling point gave a further 30 parts of desired product and 21 parts of the bis(fluoroalkyl) sulfate ester. The total yield of 1H, 1H, 2H, 2H-henicosafluoro-1-dodecanol was 148 parts (88% yield).

When the addition time for the iodide is shortened to one hour and the distillation time lengthened to nine hours in the above reaction, the yield of desired product is increased to 90%.

The purpose of the ethyl alcohol added to the preceding reaction mixture is to make the aqueous acid reaction mixture somewhat easier to stir and to make the distillation easier; the process can be carried out with the ethyl alcohol omitted if so desired.

It is understood that the preceding examples are representative and that they may be varied within the scope of the total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing fluorinated hydrocarbon alcohols which comprises reacting $R_fCH_2CH_2I$, wherein $R_f$ is a perfluoroalkyl group containing from one to twenty carbon atoms, with oleum at a temperature at which the reactants are liquid thereby obtaining an intermediate fluoralkyl hydrogen sulfate of the formula $$R_fCH_2CH_2OSO_2OH$$

hydrolyzing said intermediate by heating the intermediate in an aqueous sulfuric acid medium, and recovering the corresponding alcohol $R_fCH_2CH_2OH$ from the reaction mixture.

2. A process for preparing fluorinated hydrocarbon alcohols which comprises reacting $R_fCH_2CH_2I$, wherein $R_f$ is a perfluoroalkyl group containing from one to twenty carbon atoms, with oleum at a temperature at which the reactants are liquid thereby obtaining an intermediate fluoralkyl hydrogen sulfate of the formula $$R_fCH_2CH_2OSO_2OH$$

diluting the resulting reaction mixture with sufficient water to provide free water in the mixture, heating the reaction mixture to hydrolyze said intermediate fluoroalkyl hydrogen sulfate and recovering the corresponding alcohol $R_fCHCH_2OH$ from the reaction mixture.

3. A process for preparing $F(CF_2)_6CH_2CH_2OH$ which comprises reacting $F(CF_2)_6CH_2CH_2I$ at 25° C. with an excess of oleum thereby obtaining an intermediate of the formula $F(CF_2)_6CH_2CH_2OSO_2OH$, said oleum containing from 20 to 25% free sulfur trioxide, diluting the reaction mixture with sufficient water to provide free water in the reaction mixture, heating said reaction mixture to hydrolyze said $F(CF_2)_6CH_2CH_2OSO_2OH$, adding sodium sulfite to the reaction mixture to reduce the free iodine in the reaction medium to iodide ion, and recovering $F(CF_2)_6CH_2CH_2OH$ from the reaction mixture.

4. A process for preparing $F(CF_2)_8CH_2CH_2OH$ which comprises reacting $F(CF_2)_8CH_2CH_2I$ at a temperature of from 90 to 95° C. with an excess of oleum thereby obtaining an intermediate of the formula $$F(CF_2)_8CH_2CH_2OSO_2OH$$

said oleum containing from 20 to 25% free sulfur trioxide, diluting the reaction mixture with sufficient water to provide free water in the reaction mixture, heating said reaction mixture to hydrolyze said $$F(CF_2)_8CH_2CH_2OSO_2OH$$

adding sodium sulfite to the reaction mixture to reduce the free iodine in the reaction medium to iodide ion, and recovering $F(CF_2)_8CH_2CH_2OH$ from the reaction mixture.

5. A process for preparing $F(CF_2)_{10}CH_2CH_2OH$ which comprises reacting $F(CF_2)_{10}CH_2CH_2I$ at a temperature of from 90 to 95° C. with an excess of oleum thereby obtaining an intermediate of the formula $$F(CF_2)_{10}CH_2CH_2OSO_2OH$$

said oleum containing from 20 to 25% free sulfur trioxide, diluting the reaction mixture with sufficient water to provide free water in the reaction mixture, heating said reaction mixture to hydrolyze said $$F(CF_2)_{10}CH_2CH_2OSO_2OH$$

adding sodium sulfite to the mixture to reduce the free iodine to iodide ion, and recovering $F(CF_2)_{10}CH_2CH_2OH$ from the reaction mixture.

No references cited.

LEON ZITVER, *Primary Examiner.*

M. B. ROBERTO, J. E. EVANS, *Assistant Examiners.*